US012701455B2

(12) United States Patent
Huang et al.

(10) Patent No.: US 12,701,455 B2
(45) Date of Patent: Aug. 4, 2026

(54) DEVICES FOR TRAFFIC INDICATION IN WIRELESS LOCAL AREA NETWORKS, AND CHIP

(71) Applicant: GUANGDONG OPPO MOBILE TELECOMMUNICATIONS CORP., LTD., Dongguan (CN)

(72) Inventors: Lei Huang, Singapore (SG); Liuming Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 321 days.

(21) Appl. No.: 18/535,175

(22) Filed: Dec. 11, 2023

(65) Prior Publication Data

US 2024/0107362 A1 Mar. 28, 2024

Related U.S. Application Data

(63) Continuation of application No. PCT/CN2021/101898, filed on Jun. 23, 2021.

(51) Int. Cl.
*H04W 28/02* (2009.01)
*H04L 1/1607* (2023.01)
(Continued)

(52) U.S. Cl.
CPC ....... *H04W 28/0263* (2013.01); *H04L 1/1614* (2013.01); *H04W 76/40* (2018.02); *H04W 84/12* (2013.01)

(58) Field of Classification Search
CPC . H04W 28/0263; H04W 76/40; H04W 84/12; H04W 48/12; H04L 1/1614
See application file for complete search history.

(56) References Cited

U.S. PATENT DOCUMENTS

2010/0265864 A1* 10/2010 He ...................... H04W 68/025
370/312
2013/0155930 A1 6/2013 Chu et al.
(Continued)

FOREIGN PATENT DOCUMENTS

CN 112788716 A 5/2021

OTHER PUBLICATIONS

Young Hoon Kwon (NXP): "Multi-link TIM", IEEE Draft; 11-20-0066-02-00BE-MULTI-LINK-TIM, IEEE-SA Mentor, Piscataway, NJ USA vol. 802.11 EHT; 802.11be, No. 2May 19, 2020 (May 19, 2020), pp. 1-18, XP068167982, pp. 3,5,6, pp. 10,14.
(Continued)

*Primary Examiner* — Kibrom T Hailu
(74) *Attorney, Agent, or Firm* — BAYES PLLC

(57) ABSTRACT

An access point (AP) for traffic indication in a wireless local area network (WLAN), where the AP is affiliated with an AP multi-link device (MLD) which is configured with a first link on which the AP is parking and at least one second link, and the AP includes: a processor, configured to set a Beacon frame which includes a traffic indication map (TIM) element and at least one Extended TIM element, where the TIM element is set to indicate unicast and groupcast addressed traffic indication information for a first link of the AP MLD, and the at least one Extended TIM element is set to indicate unicast and groupcast addressed traffic indication information for the at least one second link of the AP MLD, and a transceiver, configured to send the Beacon frame to a plurality of stations (STAs).

20 Claims, 11 Drawing Sheets

(51) Int. Cl.
    *H04W 76/40*     (2018.01)
    *H04W 84/12*     (2009.01)

(56)         References Cited

U.S. PATENT DOCUMENTS

| | | | |
|---|---|---|---|
| 2015/0334654 A1 | 11/2015 | Choi | |
| 2021/0029588 A1 | 1/2021 | Cariou | |
| 2021/0051513 A1* | 2/2021 | Min | H04W 88/10 |
| 2021/0120455 A1 | 4/2021 | Das | |
| 2021/0120612 A1 | 4/2021 | Park | |

OTHER PUBLICATIONS

Jason Yuchen Guo (Huawei Technologies Co Ltd): "Multi Link Group Addressed Frame delivery for non-STR MLD", IEEE Draft; 11-20-0761-00-00BE-MULTI-LINK-GROUP-ADDRES Sed-Frame-Delivery-For-Non-STR-MLD, IEEE-SA Mentor, Piscataway, NJ USA vol. 802.11 EHT; 802.11be, Jul. 15, 2020 (Jul. 15, 2020), pp. 1-14, XP068170003, p. 8.

Supplementary European Search Report in the European application No. 21946403.9, mailed on Jul. 25, 2024, 10 pages.

IEEE P802.11 Wireless LANs, "CC34 Comment Resolution for 35.3.10.4 Traffic Indication ", Date: Apr. 23, 2021, Minyoung Park, Intel Corporation, et al. doc .: IEEE 802.11-21/0612r5. the whole document. 8 pages.

IEEE P802.11 Wireless LANs, "TBD and CR for Group addressed frames", Date: Mar. 20, 2021, Ming Gan, Huawei, et al. doc.: IEEE 802.11-21/0740r0. the whole document. 5 pages.

IEEE P802.11be™/D1.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), IEEE P802.11be/D1.0, May 2021. pp. 3-560. 635 pages.

International Search Report in the international application No. PCT/CN2021/101898, mailed on Mar. 23, 2022. 3 pages.

Written Opinion of the International Search Authority in the international application No. PCT/CN2021/101898, mailed on Mar. 23, 2022. 4 pages.

Kwon, Younghoon et al. "Multi-Link TIM", IEEE 802.11-20/0066r3, Jan. 13, 2020(Jan. 13, 2020). the whole document. 16 pages.

\* cited by examiner

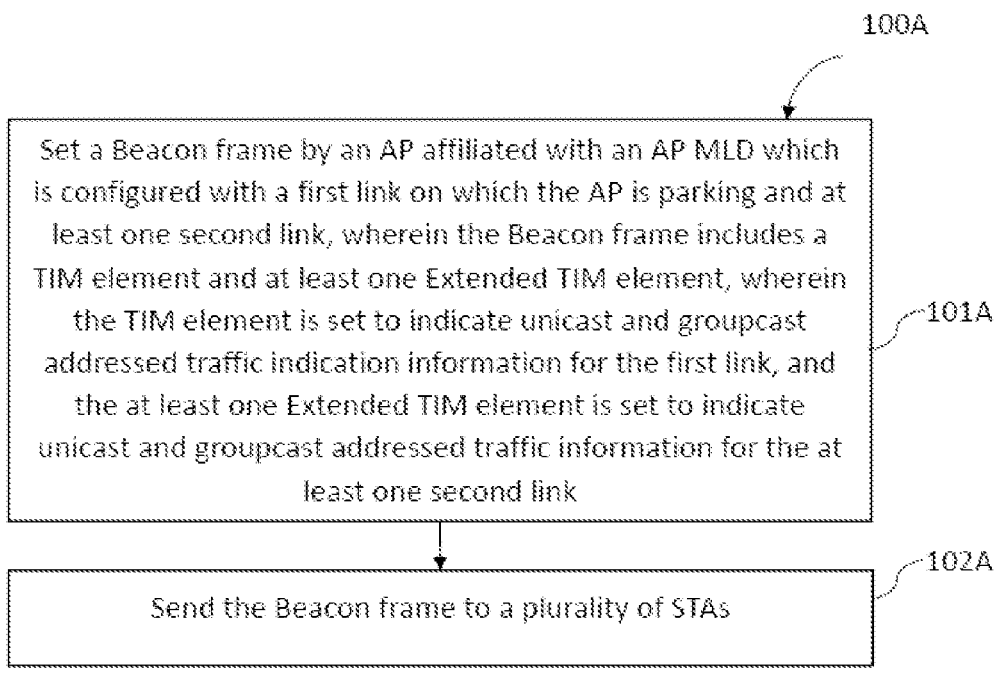

100A

Set a Beacon frame by an AP affiliated with an AP MLD which is configured with a first link on which the AP is parking and at least one second link, wherein the Beacon frame includes a TIM element and at least one Extended TIM element, wherein the TIM element is set to indicate unicast and groupcast addressed traffic indication information for the first link, and the at least one Extended TIM element is set to indicate unicast and groupcast addressed traffic information for the at least one second link

101A

Send the Beacon frame to a plurality of STAs

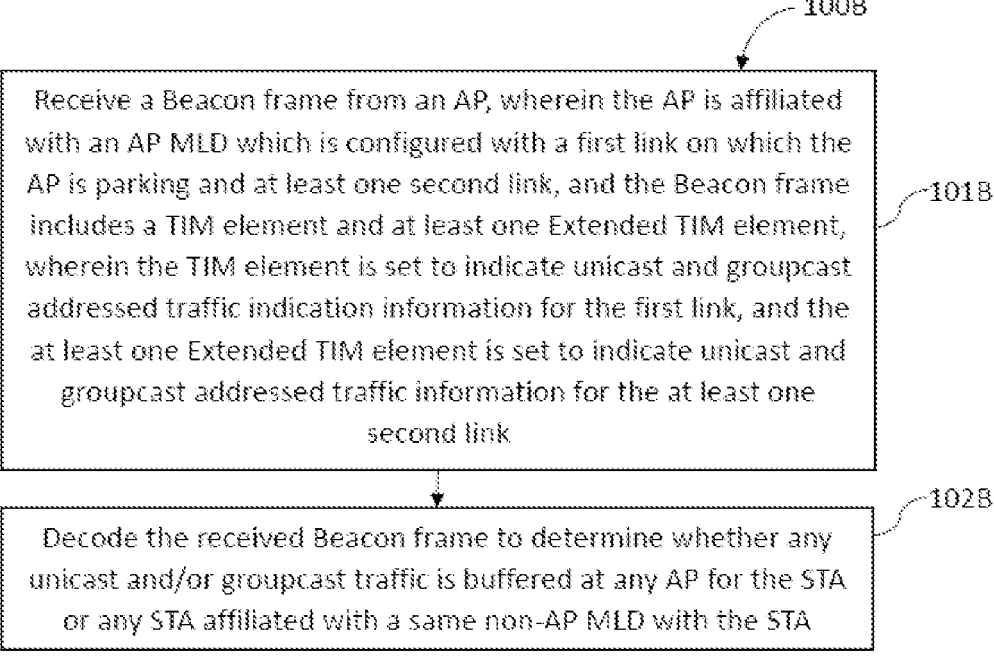

Receive a Beacon frame from an AP, wherein the AP is affiliated with an AP MLD which is configured with a first link on which the AP is parking and at least one second link, and the Beacon frame includes a TIM element and at least one Extended TIM element, wherein the TIM element is set to indicate unicast and groupcast addressed traffic indication information for the first link, and the at least one Extended TIM element is set to indicate unicast and groupcast addressed traffic information for the at least one second link Decode the received Beacon frame to determine whether any unicast and/or groupcast traffic is buffered at any AP for the STA or any STA affiliated with a same non-AP MLD with the STA

Figure 1B

| Element ID | Length | DTIM Count | DTIM Period | Bitmap Control | Partial Virtual Bitmap |
|------------|--------|------------|-------------|----------------|------------------------|
| 1 | 1 | 1 | 1 | 0 or 1 | 0 – 251 |

Octets:

Figure 2A

Bits:         4          4

| Element ID | Length | Element ID Extension | DTIM Count | DTIM Period | Per-link Traffic Indication |
|---|---|---|---|---|---|

Oct ets:    1    1    1    1    1    Variable

Figure 4A

| Link Info | Bitmap Size | Bitmap Control | Partial Virtual Bitmap |
|---|---|---|---|
| Octets: 1 | 1 | 0 or 1 | 0 – 251 |

Figure 4B

DEVICES FOR TRAFFIC INDICATION IN WIRELESS LOCAL AREA NETWORKS, AND CHIP

CROSS-REFERENCE TO RELATED APPLICATION

This application is a continuation of International Application No. PCT/CN2021/101898 filed on Jun. 23, 2021, the disclosure of which is hereby incorporated by reference in its entirety.

TECHNICAL FIELD

The disclosure relates to traffic indication for multi-link operation (MLO) in wireless communications, and more particularly to devices for traffic indication in a wireless local area network (WLAN), and a chip, especially devices suitable for unicast and groupcast addressed traffic indication for MLO in WLAN, e.g., IEEE 802.11be extremely high throughput (EHT) WLAN.

BACKGROUND

Institute of Electrical and Electronics Engineers (IEEE) 802.11 TGbe is developing a new IEEE 802.11 amendment which defines EHT physical layer (PHY) and medium access control (MAC) layer capable of supporting a maximum throughput of at least 30 Gbps. To this end, it has been proposed to enable MLO for MLDs (multi-link devices). An MLD is a device that is a logical entity, has more than one affiliated station (STA), and has a single MAC service access point (SAP) to logical link control (LLC), which includes one MAC data service. An AP MLD is an MLD, where each STA affiliated with the MLD is an access point (AP), while a non-AP MLD is an MLD, where each STA affiliated with the MLD is a non-AP STA. Although MLO has been enabled for MLDs, it is still an open issue how to efficiently exercise unicast and groupcast addressed traffic indication for MLO in a WLAN, especially IEEE 802.11be EHT WLAN.

It would therefore be desirable to provide an effective and efficient mechanism/solution for traffic indication in a WLAN, especially traffic indication for MLO in IEEE 802.11be EHT WLAN.

BRIEF DESCRIPTION OF THE DRAWINGS

The disclosure will be described in detail with reference to the accompanying drawings, in which:

FIG. 1A is a flowchart illustrating a first method for traffic indication in a WLAN carried out by an AP according to some embodiments of the disclosure.

FIG. 1B is a flowchart illustrating a second method for traffic indication in a WLAN carried out by an STA according to some embodiments of the disclosure.

FIG. 2A is a block diagram illustrating a format of a TIM element in a Beacon frame according to some embodiments of the disclosure.

FIG. 4A is a block diagram illustrating a second format of the Extended TIM element according to a second embodiment of the disclosure.

FIG. 4B is a block diagram illustrating a format of the Per-link Traffic Indication field as shown in FIG. 4A according to the second embodiment.

DETAILED DESCRIPTION

Figure 1C:
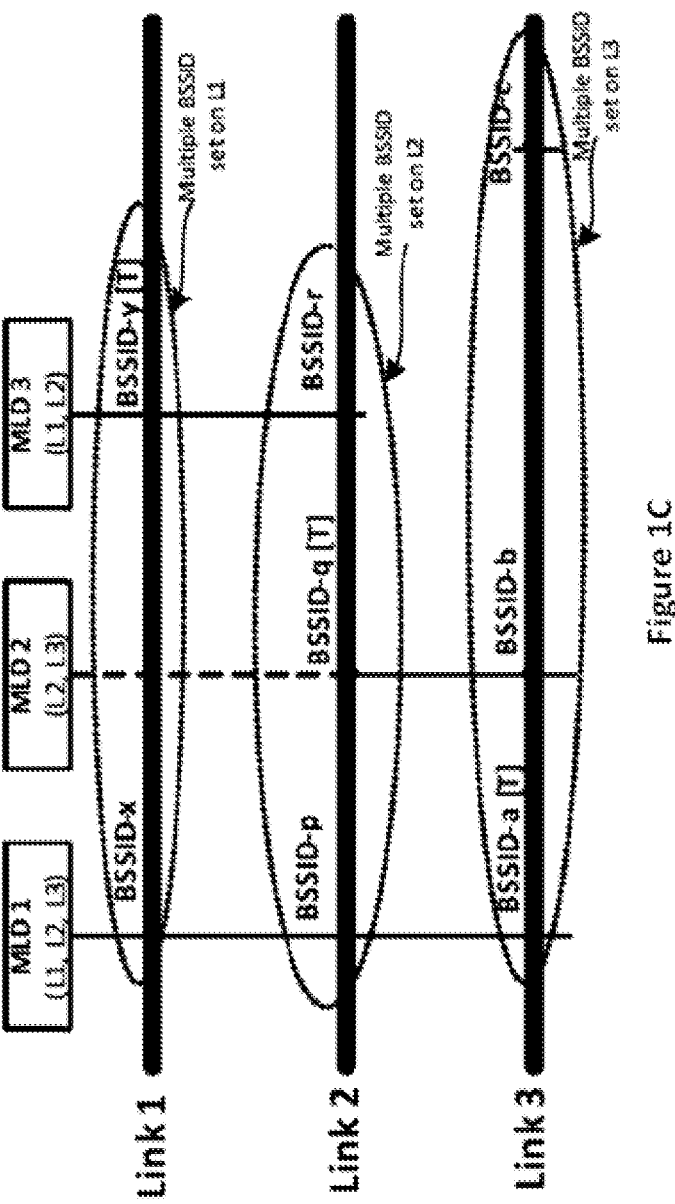
FIG. 1C is a schematic diagram illustrating a configuration of three AP MLDs according to one embodiment of the disclosure.

In the following description, numerous specific details are set forth in order to provide a thorough understanding of various illustrative embodiments of the disclosure. It will be understood, however, to one skilled in the art, that embodiments of the disclosure may be practiced without some or all of these specific details. It is understood that the terminology used herein is for the purpose of describing particular embodiments only and is not intended to limit the scope of the disclosure.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels and are not intended to impose numerical requirements on their objects. As used herein, the term "configured to" is interchangeable with "operative" or "adapted to".

According to various embodiments of the disclosure, a Beacon frame may be set/generated by an AP that is affiliated with an AP MLD to indicate traffic indication information, e.g., unicast and groupcast addressed traffic indication information, for both a link of the AP MLD on which the AP is parking, i.e., a first link of the AP MLD, and some or all of the remaining link(s) of the AP MLD, i.e., at least one second link of the AP MLD. A second link of the AP MLD refers to a link of the AP MLD on which the AP is not parking. For example, in some embodiments, the Beacon frame may be set to indicate unicast and groupcast addressed traffic indication information for all links of the AP MLD.

FIG. 1A is a flowchart illustrating a first method 100A for traffic indication in a WLAN carried out by an AP according to some embodiments of the disclosure.

At Block 101A, a Beacon frame is set by the AP affiliated with an AP MLD which is configured with a first link on which the AP is parking and at least one second link, wherein the Beacon frame includes a TIM element and at least one Extended TIM element, wherein the TIM element is set to indicate unicast and groupcast addressed traffic indication information for the first link of the AP MLD, and the at least one Extended TIM element is set to indicate unicast and groupcast addressed traffic indication information for the at least one second link of the AP MLD.

At Block 102A, the Beacon frame is sent by the AP to a plurality of STAs. The plurality of STAs may include associated STAs and/or unassociated STAs.

FIG. 1B is a flowchart illustrating a second method 100B for traffic indication in a WLAN carried out by an STA according to some embodiments of the disclosure.

At Block 101B, a Beacon frame from an AP is received by the STA, wherein the AP is affiliated with an AP MLD which is configured with a first link on which the AP is parking and at least one second link, and the Beacon frame includes a TIM element and at least one Extended TIM element, wherein the TIM element is set to indicate unicast and groupcast addressed traffic indication information for the first link of the AP MLD, and the at least one Extended TIM element is set to indicate unicast and groupcast addressed traffic indication information for the at least one second link of the AP MLD.

At Block 102B, the received Beacon frame is decoded by the STA to determine whether any unicast and/or groupcast traffic is buffered at any AP for the STA or any STA affiliated with a same non-AP MLD with the STA.

In some embodiments, a traffic indication virtual bitmap for each link of the AP MLD may be maintained by the AP MLD. It should be noted that the maintenance of the traffic indication virtual bitmap may refer to generating and/or updating the traffic indication virtual bitmap in some embodiments of the disclosure. The traffic indication virtual bitmap for each link may be updated regularly or any time when necessary. The TIM element and the at least one Extended TIM element in the Beacon frame may be set by the AP according to the traffic indication virtual bitmap for each link of the AP MLD maintained by the AP MLD.

In some embodiments, the traffic indication virtual bitmap for each link of the AP MLD may be maintained based on an association identifier (AID) space for each link of the AP MLD, wherein the AID space for each link of the AP MLD may be maintained by the AP MLD and/or a corresponding AP affiliated with the AP MLD. Each link is assigned a different AID space. The AID space for each link may be updated regularly or any time when necessary. Here, the maintenance of the AID space for a link may include maintaining a mapping between an AID assigned to an STA and an identity of the STA, e.g., the MAC address of the STA.

In some embodiments, when the AID space for each link is only maintained by a corresponding AP affiliated with the AP MLD, i.e., each AP affiliated with the AP MLD maintains the AID space for a link of the AP MLD on which the AP is parking, the AP MLD will check an AID assignment for each link maintained by the corresponding AP affiliated with the AP MLD to maintain the traffic indication virtual bitmap for each link of the AP MLD.

In some embodiments, the AID space for each link may be maintained by both the AP MLD and a corresponding AP affiliated with the AP MLD. It should be noted that the AID space for each link maintained by both the AP MLD and the corresponding AP affiliated with the AP MLD should be synchronized.

In some embodiments, the TIM element and the at least one Extended TIM element may be put together in the Beacon frame. For example, the at least one Extended TIM element may be located immediately after the TIM element in the Beacon frame.

In some embodiments, each of the at least one Extended TIM element in the Beacon frame may be set to indicate unicast and groupcast addressed traffic indication information for a corresponding second link of the AP MLD. In other words, each Extended TIM element is set to indicate traffic indication information for only one second link of the AP MLD. In one embodiment, each of the at least one Extended TIM element may include a Link ID field which is set to indicate a link identifier (ID) of the corresponding second link, and a Partial Virtual Bitmap field for the corresponding second link. The Partial Virtual Bitmap field is set to indicate the traffic virtual bitmap for the corresponding second link. Accordingly, the number of the Extended TIM element in the Beacon frame may be one or more than one and is equal to the number of second links of the AP MLD. For example, if only the first link and one second link are configured to the AP MLD, the Beacon frame includes one TIM element for the first link and one Extended TIM element for the second link. If more than one second link is configured to the AP MLD, the number of the Extended TIM element will be equal to the number of the second links.

Alternatively, in some embodiments, each of the at least one Extended TIM element in the Beacon frame may be set to indicate unicast and groupcast addressed traffic indication information for one or more of the at least one second link of the AP MLD. In one embodiment, each of the at least one Extended TIM element may include one or more than one first field, wherein each first field includes a Link Info field which is set to indicate a link ID of a corresponding second link, and a Partial Virtual Bitmap field for the corresponding second link. Accordingly, in this embodiment, the Beacon frame may include one or more than one Extended TIM element. The number of the first fields in all of the Extended TIM elements in the Beacon frame is equal to the number of the at least one second link of the AP MLD. In one example, the Beacon frame may be set to include only one Extended TIM element which includes one or more than one first field, wherein the number of the first field is equal to the number of the at least one second link of the AP MLD.

In some embodiments, each first field may further include a Bitmap size field which is set to indicate a length of the Partial Virtual Bitmap field in octets.

In some embodiments, the TIM element includes a first DTIM Count field and a first DTIM Period field, and each of the at least one Extended TIM element includes a second DTIM Count field and a second DTIM Period field, wherein the first DTIM Count field and the second DTIM Count field are set to a same value, and the first DTIM Period field and the second DTIM Period field are set to a same value. This would advantageously reduce power consumption of a STA since it only needs to periodically wake up to receive a Beacon frame and determine whether groupcast addressed traffic is buffered at each AP parking on each link of the AP MLD.

As described above, the Beacon frame in various embodiments of the disclosure may be set to indicate unicast and groupcast addressed traffic indication information for all of the links of the AP MLD, i.e., all of the links configured to the AP MLD. In one embodiment, the unicast and groupcast addressed traffic indication information for each second link of the AP MLD may be carried in a separate Extended TIM element. Alternatively, in some other embodiments, if there are a plurality of second links of the AP MLD, the unicast and groupcast addressed traffic indication information for more than one second link may be carried in one Extended TIM element. In one example, the unicast and groupcast addressed traffic indication information for all second links of the AP MLD may be carried in one Extended TIM element.

In some embodiments of the disclosure, an AP affiliated with an AP MLD may be an AP corresponding to a transmitted or a non-transmitted basic service set identifier (BSSID) in a multiple BSSID set. A multiple BSSID set is a collection of APs such that all APs in the multiple BSSID set use a common operating class, channel, receive antenna connector, and transmit antenna connector, and advertise information for multiple BSSIDs using Beacon or Probe Response frames sent by the AP corresponding to a transmitted BSSID.

FIG. 1C is a schematic diagram illustrating a configuration of three AP MLDs according to one embodiment of the disclosure. Referring to FIG. 1C, the three AP MLDs include MLD 1, MLD 2 and MLD 3. MLD 1 is configured with three links: Link 1, Link 2 and Link 3; MLD 2 is configured with two links Link 2 and Link 3; and MLD 3 is configured with two links Link 1 and Link 2. The links are assumed to be operating on different channels. All APs on each link belong to a multiple BSSID set. Since APs affiliated with an AP MLD have the same properties, such as security, APs in a multiple BSSID set on a link do not belong to the same AP MLD.

In the configuration shown in FIG. 1C, APs affiliated with an AP MLD belong to different multiple BSSID sets on their respective links. Further, each AP within the same AP MLD may correspond to a transmitted or a non-transmitted BSSID. In more details, an AP with BSSID=x that is affiliated with MLD 1 and an AP with BSSID=y that is affiliated with MLD 3 belong to a first multiple BSSID set on Link 1 in which the AP with BSSID=y and the AP with BSSID=x correspond to a transmitted BSSID and a non-transmitted BSSID of the first multiple BSSID set, respectively. An AP with BSSID=p that is affiliated with MLD 1, an AP with BSSID=q that is affiliated with MLD 2, and an AP with BSSID=r that is affiliated with MLD 3 belong to a second multiple BSSID set on Link 2 in which the AP with BSSID=q corresponds to a transmitted BSSID of the second multiple BSSID set while each of the AP with BSSID=p and the AP with BSSID=r corresponds to a non-transmitted BSSID of the second multiple BSSID set. An AP with BSSID=a that is affiliated with MLD 1, an AP with BSSID=b that is affiliated with MLD 2, and a standalone AP with BSSID=c belong to a third multiple BSSID set on Link 3 in which the AP with BSSID=a corresponds to a transmitted BSSID of the third multiple BSSID set while each of the AP with BSSID=b and the AP with BSSID=c corresponds to a non-transmitted BSSID of the third multiple BSSID set.

In some embodiments of the disclosure, an AP that is affiliated with an AP MLD and corresponds to a transmitted BSSID of a multiple BSSID set may transmit a Beacon frame at every target Beacon transmission time (TBTT), which contains unicast and groupcast addressed traffic indication information for all the links of the AP MLD. The unicast and groupcast addressed traffic indication information for a link of the AP MLD is the traffic indication information suitable for all the APs in the same multiple BSSID set on the link, and one of the APs in the same multiple BSSID set on the link is affiliated with the AP MLD.

For example, with the configuration shown in FIG. 1C, if a Beacon frame is set and transmitted by the AP with BSSID=a on Link 3, which is affiliated with MLD 1, a TIM element may be set in the Beacon frame to indicate unicast and groupcast addressed traffic indication information for the AP with BSSID=a on Link 3, i.e., the first link of MLD1, the AP with BSSID=b and the AP with BSSID=c which are in the same multiple BSSID set as the AP with BSSID=a on Link 3. At least one Extended TIM element may be set in the Beacon frame to indicate unicast and groupcast addressed traffic information for the AP with BSSID=x and the AP with BSSID=p which are affiliated with the same AP MLD with the AP with BSSID=a. Further, at least one Extended TIM element may be set in the Beacon frame to indicate unicast and groupcast addressed traffic information for the AP with BSSID=y which is in the same multiple BSSID set as the AP with BSSID=x and the APs with BSSID=q and BSSID=r which are in the same multiple BSSID set as the AP with BSSID=p.

In some embodiments of the disclosure, a traffic indication virtual bitmap for each link of the AP MLD may be maintained by the AP MLD based on an AID space for each link of the AP MLD maintained by the AP MLD and/or a corresponding AP affiliated with the AP MLD. For example, the AID space for Link 1, Link 2 and Link 3 may be maintained by the MLD 1, and/or the AID space for Link 1 may be maintained by the AP with BSSID-x, the AID space for Link 2 may be maintained by the AP with BSSID-p and the AID space for Link 3 may be maintained by the AP with BSSID-a. The traffic indication virtual bitmap maintained for each link may consist of 2008 bits which are organized into 251 octets such that bit number N ($0 \leq N \leq 2007$) in the bitmap corresponds to bit number (N mod 8) in octet number $\lfloor N/8 \rfloor$, where the low order bit of each octet is bit number 0, and the high order bit is bit number 7. The traffic indication virtual bitmap may be updated regularly or any time when necessary.

In some embodiments of the disclosure, in an AID space for each link of the AP MLD, the AIDs from 1 to $(2^n - 1)$ are kept for the multiple BSSID set and not allocated to a STA, and the remaining AIDs are shared by the basic service sets (BSSs) corresponding to the transmitted BSSID and all non-transmitted BSSIDs on the link, where the maximum possible number of BSSIDs in the multiple BSSID set is an integer power of 2 and n=log 2*(maximum possible number of BSSIDs in the multiple BSSID set).

Table 1 illustrates a format of the Beacon frame according to one embodiment of the disclosure. By doing so, when an STA parses/decodes a TIM element and the at least one Extended TIM element in a received Beacon frame and determines no unicast and groupcast traffic buffered at any AP for the STA and any STA affiliated with a same non-AP MLD as the STA, the STA may stop parsing remaining information elements in the Beacon frame. This would advantageously reduce power consumption of the STA.

TABLE 1

| Order | Information |
| --- | --- |
| 1 | Timestamp |
| 2 | Beacon Interval |
| 3 | Capability Information |
| 4 | Service Set Identifier (SSID) |
| 5 | Supported Rates and BSS Membership Selectors |
| 6 | DSSS Parameter Set (optional) |

TABLE 1-continued

| Order | Information |
|-------|-------------|
| 7 | IBSS Parameter Set (optional) |
| 8 | TIM |
| 9 | One or more Extended TIMs |
| 10 | Country |
| . . . | . . . |

TIM Element of a Beacon Frame

FIG. 2A is a block diagram illustrating a format of a TIM element in a Beacon frame according to some embodiments of the disclosure. As shown in FIG. 2A, the TIM element includes an Element ID field, a Length field, a delivery traffic indication map (DTIM) Count field, a DTIM Period field, a Bitmap Control field and a Partial Virtual Bitmap (PVB) field.

Figure 2B:
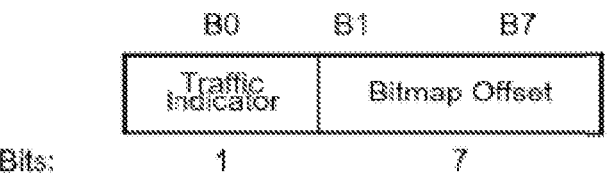
FIG. 2B is a block diagram illustrating a format of the Bitmap Control field of the TIM element as shown in FIG. 2A according to some embodiments of the disclosure.

The DTIM Count field is set to indicate how many Beacon frames, including the current frame, appear before the next DTIM Beacon frame. The DTIM Count field may be set to 0 if the current Beacon frame is a DTIM Beacon frame. The DTIM Period field is set to indicate the number of beacon intervals between successive DTIMs. If all TIMs are DTIMs, the DTIM Period field may be set to 1. FIG. 2B is a block diagram illustrating a format of the Bitmap Control field of the TIM element as shown in FIG. 2A according to some embodiments of the disclosure. As shown in FIG. 2B, the Bitmap Control field includes eight bits, the first bit B0 is set to indicate a traffic indicator, and the remaining 7 bits B1 to B7 are set to indicate Bitmap Offset. Specifically, the first bit B0 of the Bitmap Control field may contain the traffic indication virtual bitmap bit associated with AID 0 corresponding to the transmitting AP. The first bit B0 may be set to 1 in the TIM element with the DTIM Count field set to 0 when one or more group addressed MAC service data units (MSDUs) or MAC management protocol data units (MMPDUs) are buffered at the transmitting AP. The remaining 7 bits B1 to B7 of the Bitmap Control field form Bitmap Offset as shown in FIG. 2B.

In some embodiments of the disclosure, the PVB field of the TIM element may be constructed as follows:

The bits 1 to $(2^n-1)$ of the PVB field, which are called NonTxBSS identifiers (NonTxBSS IDs), are used to indicate that one or more groupcast addressed frames are buffered for each AP corresponding to a non-transmitted BSSID. The NonTxBSS ID of a non-transmitted BSSID equals to a value carried in a BSSID Index field of the Multiple BSSID-Index element corresponding to the non-transmitted BSSID. A bit position corresponding to an inactive non-transmitted BSSID is reserved and set to 0.

When the DTIM Count field carried in a Multiple BSSID-Index element is 0 for a BSS that has a non-transmitted BSSID, and one or more group addressed frames are buffered at the AP for this BSS, the corresponding NonTxBSS ID bit is set to 1.

Each bit starting from bit $2^n$ in the traffic indication virtual bitmap for the link on which the AP transmitting AP is parking corresponds to individually addressed traffic buffered for a specific STA within any BSS corresponding to a transmitted or non-transmitted BSSID at the time the Beacon frame is transmitted. The correspondence is based on the AID of the STA.

In some embodiments of the disclosure, an AP may encode or generate or set the PVB field and the Bitmap Control field of a TIM element using the following method. The PVB field includes a concatenation of octets numbered 0 to N0–1 and octets numbered N1 to N2 of the traffic indication virtual bitmap for the link on which the transmitting AP is parking, where N0 is the largest positive integer such that $N0×8-2^n<8$, i.e., N0 is the largest positive integer less than $1+2^{n-3}$. If N0 is an odd number, then N1 is the largest odd number such that N0<N1 and each of the bits N0×8 to (N1×8–1) is equal to 0. When N0 is an even number, N1 is the largest even number such that N0<N1 and each of the bits N0×8 to (N1×8–1) is equal to 0. If such a value N1>N0 does not exist, N1=N0. Additionally, N2 is the smallest integer value for which the values for bit (N2+1)×8 to 2007 in the traffic indication virtual bitmap are all 0. If such a value N2 does not exist, that is, when not all bits in the last octet of the traffic indication virtual bitmap are equal to 0, N2=250. When using this method, the Bitmap Offset subfield of the Bitmap Control field contains (N1–N0)/2, and the Length field is N0+N2–N1+4. When there are no frames buffered for any BSS corresponding to a transmitted or non-transmitted BSSID, the PVB field is encoded as a single octet equal to 0, the Bitmap Offset subfield is 0, and the Length field is 4. When there are no buffered individually addressed frames for any BSS corresponding to a transmitted or non-transmitted BSSID, but there are buffered group addressed frames for one or more of the BSSs, the PVB field includes the octets number 0 to N0–1 where N0 is the largest positive integer such that $(N0×8-2^n<8)$. In this case, the Bitmap Offset subfield value contains the number 0, and the Length field is N0+3.

Extended TIM Element of a Beacon Frame

In some embodiments, the number of Extended TIM elements in a Beacon frame transmitted by an AP that is affiliated with an AP MLD may depend on the number of the links of the AP MLD, specifically, the number of the second links of the AP MLD since the number of the second links of the AP MLD is equal to the number of all links of the AP MLD minus one. In one embodiment, the number of Extended TIM elements in the Beacon frame is equal to the number of all links of the AP MLD minus one, i.e., the number of the second links of the AP MLD. In another embodiment, the number of Extended TIM elements in the Beacon frame may be less than the number of all links of the AP MLD minus one. In various embodiments of the disclosure, an AP MLD may include at least two links, i.e., a first link on which the AP is parking and at least one second link. In this description, "the number of links or second links or Extended TIM elements" refers to a count number of the links or second links or Extended TIM elements.

Two embodiments are provided to illustrate two different formats of the Extended TIM element according to various embodiments of the disclosure.

First Embodiment

Figure 3A:
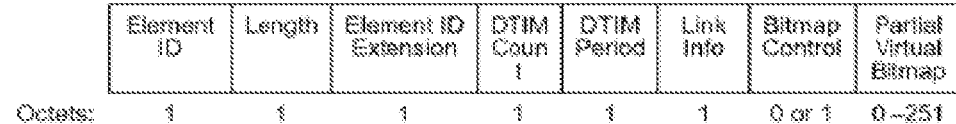
FIG. 3A is a block diagram illustrating a first format of an Extended TIM element according to a first embodiment of the disclosure.

FIG. 3A is a block diagram illustrating a first format of an Extended TIM element according to a first embodiment. Referring to FIG. 3A, in this embodiment, the Extended TIM element includes an Element ID field, a Length field, an Element ID Extension field, a DTIM Count field, a DTIM Period field, a Link Info field, a Bitmap Control field and a PVB field.

In the first embodiment of the disclosure, an Extended TIM element with the first format is set to indicate unicast and groupcast addressed traffic indication information for a link of the AP MLD except the link on which the AP is parking, i.e., each Extended TIM element is set to indicate unicast and groupcast addressed traffic indication information for a corresponding second link of the AP MLD. Accordingly, the number of the Extended TIM elements included in the Beacon frame is equal to the number of links of the AP MLD minus one, i.e., the number of the Extended TIM elements included in the Beacon frame is equal to the number of the second links of the AP MLD. As the AP MLD may include one or more second links, the number of the Extended TIM elements may be equal to 1 or greater than 1. In this embodiment, if two or more Extended TIM elements are included in a Beacon frame, no any two Extended TIM elements in the Beacon frame shall correspond to a same link.

In the Extended TIM element, the DTIM Count field and the DTIM Period field may be set or defined in the same manner as their counterparts of the TIM element. The DTIM Count fields in the TIM element and each of the one or more Extended TIM elements in a Beacon frame shall be set to a same value. Similarly, the DTIM Period fields in the TIM element and each of one or more Extended TIM elements in a Beacon frame shall be set to a same value. This would advantageously reduce power consumption of a STA since the STA only needs to periodically wake up to receive a Beacon frame and determines whether any groupcast addressed traffic is buffered at each AP parking on each link of the AP MLD.

Figure 3B:
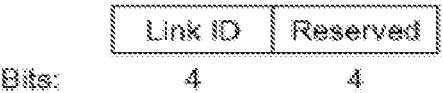
FIG. 3B is a block diagram illustrating a format of the Link Info field of the Extended TIM element as shown in FIG. 3A according to the first embodiment.

FIG. 3B is a block diagram illustrating a format of the Link Info field of the Extended TIM element as shown in FIG. 3A according to the first embodiment. As shown in FIG. 3B, the Link Info field includes a Link ID field which is set to indicate a link ID of a link to which the Extended TIM corresponds. In other words, each Extended TIM element includes a Link ID field which is set to indicate a link ID of the corresponding second link.

The Bitmap Control field of the Extended TIM element may have a same format as the counterpart of the TIM element as shown in FIG. 2B. The bit B0 of the Bitmap Control field may be set to indicate the traffic indication virtual bitmap bit associated with AID 0 corresponding to a transmitted BSSID on the link. The bit B0 may be set to 1 in the Extended TIM element with the DTIM Count field set to 0 when one or more group addressed MSDUs/MMPDUs are buffered at the AP corresponding to a transmitted BSSID on the link. The remaining 7 bits B0-B7 of the Bitmap Control field form the Bitmap Offset as shown in FIG. 2B.

In the first embodiment, the PVB field of an Extended TIM element may be constructed or generated or set in a similar manner to its counterpart of a TIM element. An AP may encode or generate or set the PVB field and the Bitmap Control field of an Extended TIM element using the following method. The PVB field may include a concatenation of octets numbered 0 to N0−1 and octets numbered N1 to N2 of the traffic indication virtual bitmap for the link to which the Extended TIM element corresponds, where N0 is the largest positive integer such that $N0×8−2''<8$. If N0 is an odd number, then N1 is the largest odd number such that N0<N1 and each of the bits $N0×8$ to $(N1×8−1)$ is equal to 0. When N0 is an even number, N1 is the largest even number such that N0<N1 and each of the bits $N0×8$ to $(N1×8−1)$ is equal to 0. If such a value N1>N0 does not exist, N1=N0. Additionally, N2 is the smallest integer value for which the values for bit $(N2+1)×8$ to 2007 in the traffic indication virtual bitmap are all 0. If such a value N2 does not exist, that is, when not all bits in the last octet of the traffic indication virtual bitmap are equal to 0, N2=250. When using this method, the Bitmap Offset subfield contains $(N1−N0)/2$, and the Length field is N0+N2−N1+6. When there are no frames buffered for any BSS corresponding to a transmitted or non-transmitted BSSID, the PVB field is encoded as a single octet equal to 0, the Bitmap Offset subfield is 0, and the Length field is 6. When there are no buffered individually addressed frames for any BSS corresponding to a transmitted or non-transmitted BSSID, but there are buffered group addressed frames for one or more of the BSSs, the PVB field consists of the octets number 0 to N0−1 where N0 is the largest positive integer such that $(N0×8−2''<8)$. In this case, the Bitmap Offset subfield value includes the number 0, and the Length field is N0+5.

According to the first embodiment, for the AP MLD configuration as shown in FIG. 1, a Beacon frame generated and transmitted by the AP with BSSID=a on Link 3 may include a TIM element corresponding to Link 3, a first Extended TIM element corresponding to Link 1 and a second Extended TIM element corresponding to Link 2. In the TIM element, if the DTIM Count field is set to 0 to indicate that the current Beacon frame is a DTIM Beacon frame, the bit B0 of the Bitmap Control field may be set to 1 when one or more group addressed MSDUs/MMPDUs are buffered at the AP with BSSID=a; the bit B1 of the PVB field may be set to 1 when one or more group addressed MSDUs/MMPDUs are buffered at the AP with BSSID=b; and the bit B2 of the PVB field may be set to 1 when one or more group addressed MSDUs/MMPDUs are buffered at the AP with BSSID=c. In the first Extended TIM element with the DTIM Count field set to 0, the bit B0 of the Bitmap Control field may be set to 1 when one or more group addressed MSDUs/MMPDUs are buffered at the AP with BSSID=x; and the bit B1 of the PVB field may be set to 1 when one or more group addressed MSDUs/MMPDUs are buffered at the AP with BSSID=y. In the second Extended TIM element with the DTIM Count field set to 0, the bit B0 of the Bitmap Control field may be set to 1 when one or more group addressed MSDUs/MMPDUs are buffered at the AP with BSSID=p; the bit B1 of the PVB field may be set to 1 when one or more group addressed MSDUs/MMPDUs are buffered at the AP with BSSID=q; and the bit B2 of the PVB field may be set to 1 when one or more group addressed MSDUs/MMPDUs are buffered at the AP with BSSID=r.

In the first embodiment, the parsing rule for the Bitmap Control field and the PVB field of an Extended TIM element is the same as their counterparts of the TIM element, which would significantly reduce the implementation complexity of an STA.

Second Embodiment

Figure 4A:
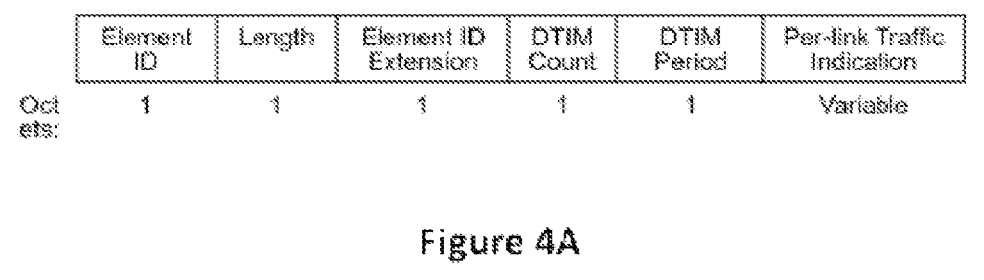

FIG. 4A is a block diagram illustrating a second format of the Extended TIM element according to a second embodiment of the disclosure. Referring to FIG. 4A, the Extended TIM element includes an Element ID field, a Length field, an Element ID Extension field, a DTIM Count field, a DTIM Period field, and a Per-link Traffic Indication field. FIG. 4B is a block diagram illustrating a format of the Per-link Traffic Indication field as shown in FIG. 4A according to the second embodiment. As shown in FIG. 4B, the Per-link Traffic Indication field may include a Link Info field, a Bitmap Size field, a Bitmap Control field and a PVB field.

In the second embodiment, an Extended TIM element with the second format is set to indicate unicast and groupcast addressed traffic indication information for one or more links of the AP MLD except the link on which the transmitting AP is parking. In other words, each Extended TIM element in the Beacon frame may be set to indicate unicast and groupcast addressed traffic indication information for one or more second links of the AP MLD. Accordingly, in the second embodiment, the number of the Extended TIM elements included in the Beacon frame may be less than the number of links of the AP MLD minus one, i.e., less than the number of the second links of the AP MLD. In one embodiment, the Beacon frame may only include one Extended TIM element which is set to indicate unicast and groupcast addressed traffic indication information for all the second links of the AP MLD. The AP MLD may include one or more second links.

In the second embodiment, the DTIM Count field and the DTIM Period field of the Extended TIM element may be set or defined in the same manner as their counterparts of the TIM element. The DTIM Count fields in the TIM element and each Extended TIM element in a Beacon frame shall be set to a same value. Similarly, the DTIM Period fields in the TIM element and each Extended TIM element in a Beacon frame shall be set to a same value. This would advantageously reduce power consumption of an STA since the STA only needs to periodically wake up to receive a Beacon frame and determines whether groupcast addressed traffic is buffered at each AP parking on each link of the AP MLD.

In the second embodiment, each Extended TIM element may include one or more first fields, e.g., Per-link PVB fields, in the Per-link Traffic Indication field. Each first field is set to indicate unicast and groupcast addressed traffic indication information for a corresponding second link of the AP MLD.

Referring to FIG. 4B, the Per-link Traffic Indication field of the Extended TIM element may include one or more Per-link PVB fields, i.e., the first fields, each corresponding to a specific second link of the AP MLD. If two or more Per-link PVB fields are included in the one or more Extended TIM elements, no any two Per-link PVB fields shall correspond to a same second link of the AP MLD.

In the second embodiment, the Link Info field of the Per-link PVB subfield may have a format same as the Link Info field of the Extended TIM element in the first embodiment, as shown in FIG. 3B. The Link ID field of the Link Info field may be set to indicate a link ID of a link to which the Per-link PVB subfield corresponds. The Bitmap Size field may be set to indicate a length of the PVB field in octets.

In the second embodiment, the Bitmap Control filed of the Per-link PVB field may have a same format as the Bitmap Control field of the Extended TIM element in the first embodiment, as shown in FIG. 2B. The bit B0 of the Bitmap Control field may be set to indicate the traffic indication virtual bitmap bit associated with AID 0 corresponding to a transmitted BSSID on the link. The bit B0 may be set to 1 in the Per-link Traffic Indication field when the DTIM Count field of the Extended TIM element is set to 0 and one or more group addressed MSDUs/MMPDUs are buffered at the AP corresponding to a transmitted BSSID on the link. The remaining 7 bits B0-B7 of the Bitmap Control field form the Bitmap Offset as shown in FIG. 2B. When the Bitmap Size field is set to 0 to indicate that the PVB field is not present in the Per-link PVB subfield, the Bitmap Control field is not present as well.

In the second embodiment, each Per-link Partial Virtual Bitmap subfield, i.e., each first field, may include a PVB field which is set to indicate unicast and groupcast addressed traffic indication information for the corresponding second link and a Bitmap size field which is set to indicate a length of the Partial Virtual Bitmap field in octets.

In the second embodiment, the PVB field in a Per-link Partial Virtual Bitmap subfield of the Extended TIM element may be constructed in a similar manner as its counterpart of the TIM element. An AP may encode or generate or set the PVB field, the Bitmap Size field and the Bitmap Control field in a Per-link Partial Virtual Bitmap subfield of the Extended TIM element using the following method. The PVB field may include a concatenation of octets numbered 0 to N0−1 and octets numbered N1 to N2 of the traffic indication virtual bitmap for the link to which the Per-link Partial Virtual Bitmap subfield corresponds, where N0 is the largest positive integer such that $N0 \times 8 - 2^n < 8$. If N0 is an odd number, then N1 is the largest odd number such that N0<N1 and each of the bits $N0 \times 8$ to $(N1 \times 8 - 1)$ is equal to 0. When N0 is an even number, N1 is the largest even number such that N0<N1 and each of the bits $N0 \times 8$ to $(N1 \times 8 - 1)$ is equal to 0. If such a value N1>N0 does not exist, N1=N0. Additionally, N2 is the smallest integer value for which the values for bit $(N2+1) \times 8$ to 2007 in the traffic indication virtual bitmap are all 0. If such a value N2 does not exist, that is, when not all bits in the last octet of the traffic indication virtual bitmap are equal to 0, N2=250. When using this method, the Bitmap Offset subfield contains $(N1-N0)/2$ and the Bitmap Size field is $N0+N2-N1+1$. When there are no frames buffered for any BSS corresponding to a transmitted or non-transmitted BSSID supported, the PVB field is encoded as a single octet equal to 0, the Bitmap Offset subfield is 0 and the Bitmap Size field is 1. When there are no buffered individually addressed frames for any BSS corresponding to a transmitted or non-transmitted BSSID, but there are buffered group addressed frames for one or more of the BSSs, the PVB field consists of the octets number 0 to N0−1 where N0 is the largest positive integer such that $(N0 \times 8 - 2^n < 8)$. In this case, the Bitmap Offset subfield value contains the number 0 and the Bitmap Size field is N0.

According to the second embodiment, for the AP MLD configuration as shown in FIG. 1C, a Beacon frame generated and transmitted by the AP with BSSID=a on Link 3 may include a TIM element corresponding to Link 3 and one Extended TIM element corresponding to Link 1 and Link 2. In the TIM element, if the DTIM Count field is set to 0 to indicate that the current Beacon frame is a DTIM Beacon frame, the bit B0 of the Bitmap Control field may be set to 1 when one or more group addressed MSDUs/MMPDUs are buffered at the AP with BSSID=a; the bit B1 of the PVB field may be set to 1 when one or more group addressed MSDUs/MMPDUs are buffered at the AP with BSSID=b; and the bit B2 of the PVB field may be set to 1 when one or more group addressed MSDUs/MMPDUs are buffered at the AP with BSSID=c. In the Extended TIM element with the DTIM Count field set to 0, the bit B0 of the Bitmap Control field in a first Per-link Partial Virtual Bitmap subfield corresponding to Link 1 may be set to 1 when one or more group addressed MSDUs/MMPDUs are buffered at the AP with BSSID=x; and the it B1 of the PVB field in the first Per-link Partial Virtual Bitmap subfield may be set to 1 when one or more group addressed MSDUs/MMPDUs are buffered at the AP with BSSID=y. The bit B0 of the Bitmap Control field in a second Per-link Partial Virtual Bitmap subfield corresponding to Link 2 may be set to 1 when one or more group addressed MSDUs/MMPDUs are buffered at the AP with BSSID=p; the bit B1 of the PVB field in the second Per-link Partial Virtual Bitmap subfield may be set to 1 when one or more group addressed MSDUs/MMPDUs are buffered at the AP with BSSID=q; and the bit B2 of the PVB field in the second Per-link Partial Virtual Bitmap subfield may be set to 1 when one or more group addressed MSDUs/MMPDUs are buffered at the AP with BSSID=r.

In the second embodiment, the parsing rule for the Bitmap Control field and the PVB field of a Per-link Partial Virtual Bitmap subfield of an Extended TIM element is the same as their counterparts of the TIM element, which would significantly reduce the implementation complexity of an STA.

When the method proposed in the second embodiment is used for traffic indication, the overhead in a Beacon frame may be significantly reduced compared to the first embodiment with the increase of the number of links of an AP MLD.

In both the first embodiment and the second embodiment, the DTIM Count fields in the TIM element and each of the at least one Extended TIM element are set to the same value, and the DTIM Period fields in the TIM element and each of the at least one Extended TIM element are set to the same value.

It should be noted that the names and order of the fields in the TIM element or Extended TIM element in the first and second embodiments of the disclosure are only for illustration purpose, not to limit the scope of the disclosure. In other embodiments, the order and/or names of the fields may be different, for example, the DTIM Count field, the DTIM Period field, the Per-link Traffic Indication field and the fields in the Per-link Traffic Indication field.

Figure 5:
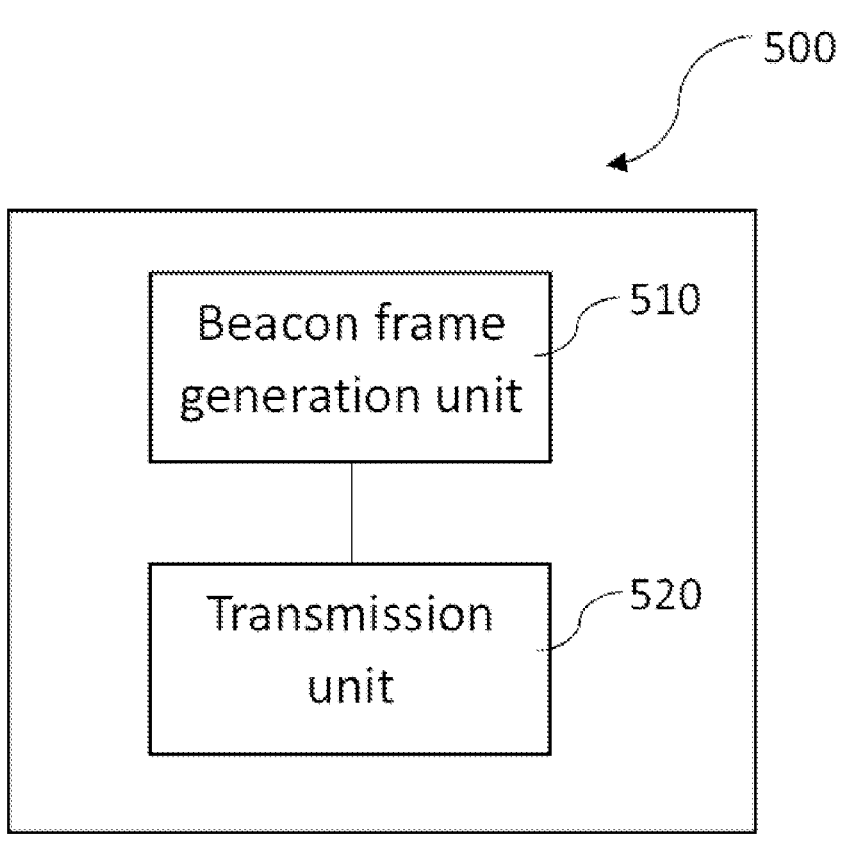
FIG. 5 is a schematic diagram illustrating an AP according to some embodiments of the disclosure.

Various embodiments of the disclosure also provide an AP for traffic indication in a WLAN. FIG. 5 is a schematic diagram illustrating an AP 500 according to some embodiments of the disclosure. Referring to FIG. 5, the AP 500 may include a beacon frame generation unit 510 and a transmission unit 520. The AP 500 is affiliated with an AP MLD which is configured with a first link on which the AP 500 is parking and at least one second link. The beacon frame generation unit 510 may be configured to set a Beacon frame which comprises a traffic indication map (TIM) element and at least one Extended TIM element, wherein the TIM element is set to indicate unicast and groupcast addressed traffic indication information for the first link of the AP MLD, and the at least one Extended TIM element is set to indicate unicast and groupcast addressed traffic indication information for the at least one second link of the AP MLD. The transmission unit 520 is configured to send the generated Beacon frame to a plurality of STAs. The STAs may include associated and unassociated STAs.

In some embodiments, the AP MLD may maintain a traffic indication virtual bitmap for each link of the AP MLD. The traffic indication virtual bitmap for each link may be updated regularly or any time when necessary. The beacon frame generation unit 510 may be configured to set the TIM element and the at least one Extended TIM element in the Beacon frame according to the traffic indication virtual bitmap for each link maintained by the AP MLD.

In some embodiments, the traffic indication virtual bitmap for each link of the AP MLD may be maintained based on an AID space for each link of the AP MLD, wherein the AID space for each link of the AP MLD may be maintained by the AP MLD and/or a corresponding AP affiliated with the AP MLD. Each link is assigned a different AID space. The AID space for each link may be updated regularly or any time when necessary.

In some embodiments, when the AID space for each link is only maintained by a corresponding AP affiliated with the AP MLD, i.e., each AP affiliated with the AP MLD maintains the AID space for a link of the AP MLD on which the AP is parking. In these embodiments, the AP MLD will check an AID assignment for each link from the corresponding AP affiliated with the AP MLD to maintain the traffic indication virtual bitmap for each link. Accordingly, the AP 500 may further include an AID space unit configured to maintain an AID space for a link of the AP MLD on which the AP is parking.

In some embodiments, the AID space for each link may be maintained by both the AP MLD and a corresponding AP affiliated with the AP MLD. It should be noted that the AID space for each link maintained by both the AP MLD and the corresponding AP affiliated with the AP MLD should be synchronized.

In some embodiments, the beacon frame generation unit 510 may be configured to put the TIM element and the at least one Extended TIM element together in the Beacon frame.

In some embodiments, the beacon frame generation unit 510 may be configured to locate the at least one Extended TIM element immediately after the TIM element in the Beacon frame.

In some embodiments, the beacon frame generation unit 510 may be further configured to set each of the at least one Extended TIM element in the Beacon frame to indicate unicast and groupcast addressed traffic indication information for a corresponding second link of the AP MLD. In one embodiment, the beacon frame generation unit 510 may be further configured to set each of the at least one Extended TIM element in the Beacon frame to include a Link ID field which is set to indicate a link ID of the corresponding second link of the AP MLD, and a Partial Virtual Bitmap field for the corresponding second link. Accordingly, the number of the Extended TIM element in the Beacon frame may be one or more than one and is equal to the number of second links of the AP MLD.

Alternatively, in some embodiments, the beacon frame generation unit 510 may be further configured to set each of the at least one Extended TIM element in the Beacon frame to indicate unicast and groupcast addressed traffic indication information for one or more of the at least one second link of the AP MLD. In one embodiment, the beacon frame generation unit 510 may be further configured to set each of the at least one Extended TIM element in the Beacon frame to include one or more than one first field, wherein each first field includes a Link Info field which is set to indicate a link ID of a corresponding second link, and a Partial Virtual Bitmap field for the corresponding second link. Accordingly, in this embodiment, the Beacon frame may include one or more than one Extended TIM element. The number of the first fields in all of the Extended TIM elements in the Beacon frame is equal to the number of the at least one second link of the AP MLD. In one example, the Beacon frame may be set to include only one Extended TIM element which includes one or more than one first field, wherein the number of the first field is equal to the number of the at least one second link of the AP MLD.

In some embodiments of the disclosure, the beacon frame generation unit 510 may be further configured to set each first field to include a Bitmap size field for indicating a length of the Partial Virtual Bitmap field in octets.

In some embodiments, the beacon frame generation unit 510 may be further configured to set the TIM element to include a first DTIM Count field and a first DTIM Period field, and set each of the at least one Extended TIM element to include a second DTIM Count field and a second DTIM Period field, wherein the first DTIM Count field and the second DTIM Count field are set to a same value, and the first DTIM Period field and the second DTIM Period field are set to a same value.

Figure 6:
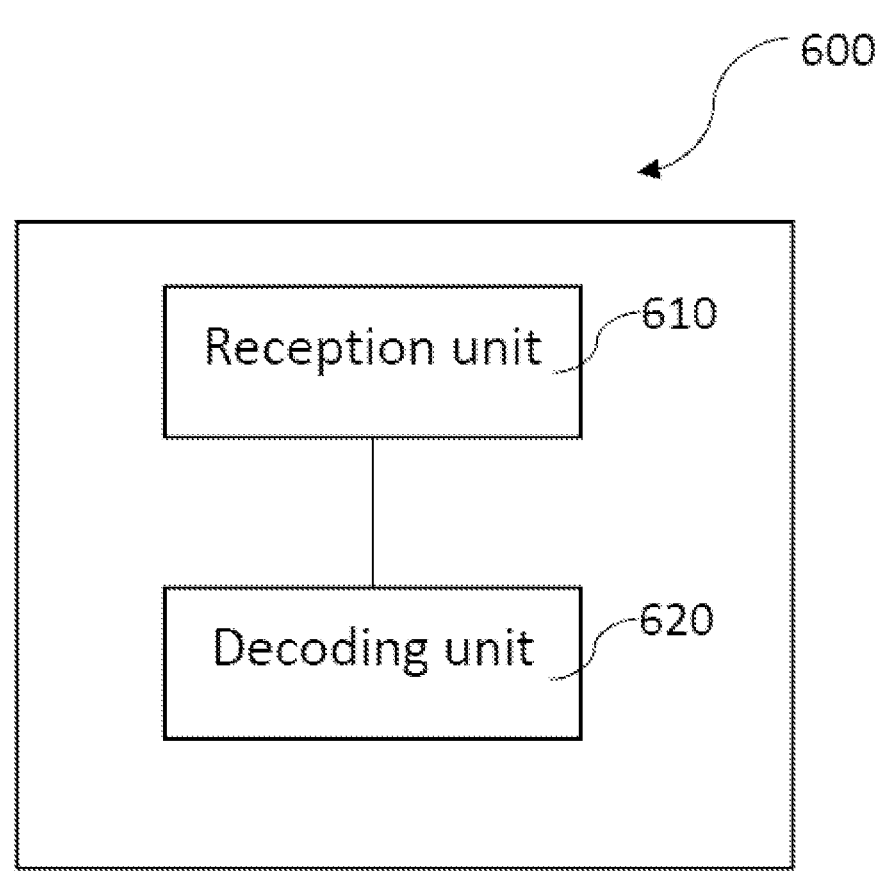
FIG. 6 is a schematic diagram illustrating an STA according to some embodiments of the disclosure.

Various embodiments of the disclosure also provide an STA for traffic indication in a WLAN. FIG. 6 is a schematic diagram illustrating an STA 600 according to some embodiments of the disclosure. Referring to FIG. 6, the STA 600 may include a reception unit 610 and a decoding unit 620.

The reception unit 610 is configured to receive a Beacon frame from an AP which is configured with a first link on which the AP is parking and at least one second link, wherein the Beacon frame comprises a TIM element and at least one Extended TIM element, wherein the TIM element is set to indicate unicast and groupcast addressed traffic indication information for the first link of the AP MLD, and the at least one Extended TIM element is set to indicate unicast and groupcast addressed traffic indication information for the at least one second link of the AP MLD. The decoding unit 620 is configured to decode the received Beacon frame to determine whether any unicast and/or groupcast traffic is buffered at any AP for the STA 600 or any STA affiliated with a same non-AP MLD with the STA 600.

In some embodiments, the TIM element and the at least one Extended TIM element may be set according to a traffic indication virtual bitmap for each link of the AP MLD maintained by the AP MLD.

In some embodiments, the traffic indication virtual bitmap for each link of the AP MLD may be maintained based on an AID space for each link of the AP MLD, wherein the AID space for each link of the AP MLD is maintained by the AP MLD and/or a corresponding AP affiliated with the AP MLD.

In some embodiments, the TIM element and the at least one Extended TIM element may be put together in the Beacon frame.

In some embodiments, for example, the at least one Extended TIM element may be located immediately after the TIM element in the Beacon frame.

In some embodiments, each of the at least one Extended TIM element in the Beacon frame may be set to indicate unicast and groupcast addressed traffic indication information for a corresponding second link of the AP MLD.

In one embodiment, each of the at least one Extended TIM element in the Beacon frame may include a Link ID field which is set to indicate a link ID of the corresponding second link of the AP MLD, and a Partial Virtual Bitmap field for the corresponding second link. Accordingly, the number of the Extended TIM element in the Beacon frame may be one or more than one and is equal to the number of second links of the AP MLD.

Alternatively, in some embodiments, each of the at least one Extended TIM element in the Beacon frame may be set to indicate unicast and groupcast addressed traffic indication information for one or more of the at least one second link of the AP MLD. In one embodiment, each of the at least one Extended TIM element in the Beacon frame may include one or more than one first field, e.g., Per-link Traffic Indication field in the second embodiment as shown in FIGS. 4A and 4B, wherein each first field includes a Link Info field which is set to indicate a link ID of a corresponding second link, and a Partial Virtual Bitmap field for the corresponding second link. Accordingly, in this embodiment, the Beacon frame may include one or more than one Extended TIM element. The number of the first fields in all of the Extended TIM elements in the Beacon frame is equal to the number of the second links of the AP MLD.

In some embodiments of the disclosure, each first field may further include a Bitmap size field which is set to indicate a length of the Partial Virtual Bitmap field in octets.

In some embodiments, the TIM element in the Beacon frame may include a first DTIM Count field and a first DTIM Period field, and each of the at least one Extended TIM element may include a second DTIM Count field and a second DTIM Period field, wherein the first DTIM Count field and the second DTIM Count field are set to a same value, and the first DTIM Period field and the second DTIM Period field are set to a same value.

Various embodiments of the disclosure also provide an AP for traffic indication in a WLAN. The AP may include a memory to store instructions for performing the first method for traffic indication in the WLAN, and a processor communicably coupled with the memory, the processor configured to execute the instructions to perform the first method for traffic indication in a WLAN as described in various embodiments of the disclosure.

Various embodiments of the disclosure also provide an STA for traffic indication in a WLAN. The STA may include a memory to store instructions for performing the second method for traffic indication in the WLAN, and a processor communicably coupled with the memory, the processor configured to execute the instructions to perform the second method for traffic indication in a WLAN as described in various embodiments of the disclosure.

Various embodiments of the disclosure also provide a computer program product comprising instructions to cause a computer to perform any method for traffic indication in a WLAN according to any embodiment of the disclosure, when executed thereon.

Various embodiments of the disclosure also provide a computer program comprising instructions to cause a computer to perform a method for traffic indication in a WLAN according to any embodiment of the disclosure, when executed thereon.

Various embodiments of the disclosure also provide a non-volatile storage medium comprising computer program codes to cause a computer to perform a method for traffic indication in a WLAN according to any embodiment of the disclosure, when executed thereon.

Various embodiments of the disclosure also provide a chip configured to perform a method for traffic indication in a WLAN according to any embodiment of the disclosure.

Embodiments of the disclosure provide effective and efficient methods and devices for traffic indication in a WLAN. In various embodiments of the disclosure, a Beacon frame may be generated or set by an AP affiliated with an AP multi-link device (MLD) which is configured with a plurality of links, to indicate unicast and groupcast addressed traffic indication information for some or all of the links of the AP MLD.

According to a first aspect of the disclosure, various embodiments of the disclosure provide a first method for traffic indication in a WLAN performed at an AP. The method may include: setting, by an AP affiliated with an AP MLD which is configured with a first link on which the AP is parking and at least one second link, a Beacon frame which comprises a traffic indication map (TIM) element and at least one Extended TIM element, wherein the TIM element is set to indicate unicast and groupcast addressed traffic indication information for the first link of the AP MLD, and the at least one Extended TIM element is set to indicate unicast and groupcast addressed traffic indication information for the at least one second link of the AP MLD, and sending, by the AP, the Beacon frame to a plurality of STAs.

According to a second aspect of the disclosure, various embodiments of the disclosure provide a second method for traffic indication in a WLAN performed at an STA. The method may include: receiving, by an STA, a Beacon frame from an AP affiliated with an AP MLD which is configured with a first link on which the AP is parking and at least one second link, wherein the Beacon frame comprises a TIM element and at least one Extended TIM element, wherein the TIM element is set to indicate unicast and groupcast addressed traffic indication information for the first link of the AP MLD, and the at least one Extended TIM element is set to indicate unicast and groupcast addressed traffic indication information for the at least one second link of the AP MLD, and decoding, by the STA, the received Beacon frame to determine whether any unicast and/or groupcast traffic is buffered at any AP for the STA or any STA affiliated with a same non-AP MLD with the STA.

According to a third aspect of the disclosure, various embodiments of the disclosure provide an AP for traffic indication in a WLAN. The AP is affiliated with an AP MLD which is configured with a first link on which the AP is parking and at least one second link, and the AP may include: a beacon frame generation unit configured to set a Beacon frame which comprises a TIM element and at least one Extended TIM element, wherein the TIM element is set to indicate unicast and groupcast addressed traffic indication information for a first link of the AP MLD, and the at least one Extended TIM element is set to indicate unicast and groupcast addressed traffic indication information for the at least one second link of the AP MLD, and a transmission unit configured to send the Beacon frame to a plurality of STAs.

According to a fourth aspect of the disclosure, various embodiments of the disclosure provide an STA for traffic indication in a WLAN. The STA may include: a reception unit configured to receive a Beacon frame from an AP affiliated with an AP MLD which is configured with a first link on which the AP is parking and at least one second link, wherein the Beacon frame comprises a TIM element and at least one Extended TIM element, wherein the TIM element is set to indicate unicast and groupcast addressed traffic indication information for the first link of the AP MLD, and the at least one Extended TIM element is set to indicate unicast and groupcast addressed traffic indication information for the at least one second link of the AP MLD, and a decoding unit configured to decode the received Beacon frame to determine whether any unicast and/or groupcast traffic is buffered at any AP for the STA or any STA affiliated with a same non-AP MLD with the STA.

According to a fifth aspect of the disclosure, various embodiments of the disclosure provide an AP for traffic indication in a WLAN. The AP may comprise a memory to store instructions for performing the first method for traffic indication in the WLAN, and a processor communicably coupled with the memory, the processor configured to execute the instructions to perform the first method for traffic indication in a WLAN as described in various embodiments of the disclosure.

According to a sixth aspect of the disclosure, various embodiments of the disclosure provide an STA for traffic indication in a WLAN. The STA may include a memory to store instructions for performing the second method for traffic indication in the WLAN, and a processor communicably coupled with the memory, the processor configured to execute the instructions to perform the second method for traffic indication in a WLAN as described in various embodiments of the disclosure.

According to a seventh aspect of the disclosure, various embodiments of the disclosure provide a computer program product. The computer program product comprises instructions to cause a computer to perform the first or the second method for traffic indication in a WLAN according to any embodiment of the disclosure, when executed thereon.

According to an eighth aspect of the disclosure, various embodiments of the disclosure provide a computer program comprising instructions to cause a computer to perform a method for traffic indication in a WLAN according to any embodiment of the disclosure, when executed thereon.

According to a ninth aspect of the disclosure, various embodiments of the disclosure provide a chip configured to perform a method for traffic indication in a WLAN according to any embodiment of the disclosure.

At least some steps of the methods for traffic indication in a WLAN according to any embodiments of the disclosure described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media.

As described above, in various embodiments of the disclosure, a Beacon frame may be generated by an AP affiliated with an AP MLD to indicate, in a TIM element, unicast and groupcast addressed traffic indication information for the link of the AP MLD on which the AP is parking, and indicate, in at least one Extended TIM element, unicast and groupcast addressed traffic indication information for the remaining link(s) of the AP MLD. With the proposed methods and devices, the STA which receives a Beacon frame from the AP can determine whether any unicast and/or groupcast traffic buffered at any AP for itself by parsing the TIM element and one or more Extended TIM elements in the Beacon frame. As such, if the STA determines that no Unicast and groupcast traffic buffered at any AP for itself, the STA may stop parsing other information elements in the Beacon frame. This would significantly reduce the implementation complexity and power consumption of the STA. In conclusion, various embodiments of the disclosure provide an efficient and effective solution for traffic indication in a WLAN.

It is to be understood that the embodiments and features described above should be considered exemplary and not restrictive. Many other embodiments will be apparent to those skilled in the art from consideration of the specification and practice of the disclosure. The scope of the disclosure should, therefore, be determined with reference to the appended claims, along with the full scope of equivalents to which such claims are entitled. Furthermore, certain terminology has been used for the purposes of descriptive clarity, and not to limit the disclosed embodiments of the disclosure.

The invention claimed is:

1. An access point (AP) for traffic indication in a wireless local area network (WLAN), wherein the AP is affiliated with an AP multi-link device (MLD) which is configured with a first link on which the AP is parking and at least one second link, and the AP comprises:

a processor, configured to set a frame which comprises a traffic indication map (TIM) element and an Extended TIM element, wherein the TIM element is set to indicate unicast and groupcast addressed traffic indication information for the first link of the AP MLD, and the Extended TIM element is set to indicate unicast and groupcast addressed traffic indication information for the at least one second link of the AP MLD, and a transceiver, configured to send the frame to a plurality of stations (STAs), wherein the processor is further configured to set the TIM element and the Extended TIM element according to a traffic indication virtual bitmap for each link of the AP MLD maintained by the AP MLD, wherein the TIM element comprises a first Element ID field, a first Length field, a first delivery traffic indication map (DTIM) Count field, a first DTIM Period field, a first Bitmap Control field and a first Partial Virtual Bitmap (PVB) field, and the Extended TIM element comprises a second Element ID field, a second Length field, an Element ID Extension field, a second DTIM Count field, a second DTIM Period field, a Link Info field, a second Bitmap Control field and a second PVB field, wherein the first DTIM Count field in the TIM element and the second DTIM Count field in the Extended TIM element are set to a same value, and the first DTIM Period field in the TIM element and the second DTIM Period field in the Extended TIM element are set to a same value.

2. The AP according to claim 1, wherein the traffic indication virtual bitmap for each link of the AP MLD is maintained based on an association identifier (AID) space for each link of the AP MLD, wherein the AID space for each link of the AP MLD is maintained by the AP MLD and/or a corresponding AP affiliated with the AP MLD.

3. The AP according to claim 1, wherein the processor is further configured to put the TIM element and the Extended TIM element together in the Beacon-frame.

4. The AP according to claim 3, wherein the processor is further configured to locate the Extended TIM element immediately after the TIM element in the frame.

5. The AP according to claim 1, wherein the Extended TIM element comprises one or more Extended TIM elements, and the processor is further configured to set each of the one or more Extended TIM elements in the frame to indicate unicast and groupcast addressed traffic indication information for a corresponding second link of the AP MLD.

6. The AP according to claim 5, wherein the Link Info field in each of the one or more Extended TIM elements comprises a Link ID field which is set to indicate a link ID of the corresponding second link of the AP MLD.

7. The AP according to claim 1, wherein the processor is further configured to set the Extended TIM element in the frame to indicate unicast and groupcast addressed traffic indication information for one or more of the at least one second link of the AP MLD.

8. The AP according to claim 7, wherein the Extended TIM element comprises one or more than one first field, and each first field includes the Link Info field which is set to indicate a link ID of a corresponding second link, and the second PVB field for the corresponding second link.

9. The AP according to claim 8, wherein the number of the first field is equal to the number of the at least one second link of the AP MLD.

10. The AP according to claim 8, wherein each first field further comprises a Bitmap size field which is set to indicate a length of the second PVB field in octets.

11. A station (STA) for traffic indication in a wireless local area network (WLAN), the STA comprising:

a transceiver, configured to receive a frame from an access point (AP) affiliated with an AP multi-link device (MLD) which is configured with a first link on which the AP is parking and at least one second link, wherein the frame comprises a traffic indication map (TIM) element and an Extended TIM element, wherein the TIM element is set to indicate unicast and groupcast addressed traffic indication information for the first link of the AP MLD, and the Extended TIM element is set to indicate unicast and groupcast addressed traffic indication information for the at least one second link of the AP MLD, and a processor, configured to decode the received frame to determine whether any unicast and/or groupcast traffic is buffered at any AP for the STA or any STA affiliated with a same non-AP MLD with the STA, wherein the TIM element and the Extended TIM element are set according to a traffic indication virtual bitmap for each link of the AP MLD maintained by the AP MLD, wherein the TIM element comprises a first Element ID field, a first Length field, a first delivery traffic indication map (DTIM) Count field, a first DTIM Period field, a first Bitmap Control field and a first Partial Virtual Bitmap (PVB) field, and the Extended TIM element comprises a second Element ID field, a second Length field, an Element ID Extension field, a second DTIM Count field, a second DTIM Period field, a Link Info field, a second Bitmap Control field and a second PVB field, wherein the first DTIM Count field in the TIM element and the second DTIM Count field in the Extended TIM element are set to a same value, and the first DTIM Period field in the TIM element and the second DTIM Period field in the Extended TIM element are set to a same value.

12. The STA according to claim 11, wherein the traffic indication virtual bitmap for each link of the AP MLD is maintained based on an association identifier (AID) space for each link of the AP MLD, wherein the AID space for each link of the AP MLD is maintained by the AP MLD and/or a corresponding AP affiliated with the AP MLD.

13. The STA according to claim 11, wherein the TIM element and the Extended TIM element are put together in the frame.

14. The STA according to claim 13, wherein the Extended TIM element is located immediately after the TIM element in the frame.

15. The STA according to claim 11, wherein the Extended TIM element comprises one or more Extended TIM elements, and each of the one or more Extended TIM elements in the frame is set to indicate unicast and groupcast addressed traffic indication information for a corresponding second link of the AP MLD.

16. The STA according to claim 15, wherein the Link Info field in each of the one or more Extended TIM elements comprises a Link ID field which is set to indicate a link ID of the corresponding second link of the AP MLD.

17. The STA according to claim 11, wherein the Extended TIM element is set to indicate unicast and groupcast addressed traffic indication information for one or more of the at least one second link of the AP MLD.

18. The STA according to claim 17, wherein the Extended TIM element includes one or more than one first field, and each first field includes the Link Info field which is set to indicate a link ID of a corresponding second link, and the second PVB field for the corresponding second link, wherein the number of the first field is equal to the number of the at least one second link of the AP MLD.

19. The STA according to claim 18, wherein each first field further comprises a Bitmap size field which is set to indicate a length of the second PVB field in octets.

20. A chip, comprising:

a transceiver, configured to receive a frame from an access point (AP) affiliated with an AP multi-link device (MLD) which is configured with a first link on which the AP is parking and at least one second link, wherein the frame comprises a traffic indication map (TIM) element and an Extended TIM element, wherein the TIM element is set to indicate unicast and groupcast addressed traffic indication information for the first link of the AP MLD, and the Extended TIM element is set to indicate unicast and groupcast addressed traffic indication information for the at least one second link of the AP MLD, and a processor, configured to decode the received frame to determine whether any unicast and/or groupcast traffic is buffered at any AP for a station (STA) or any STA affiliated with a same non-AP MLD with the STA, wherein the TIM element and the Extended TIM element are set according to a traffic indication virtual bitmap for each link of the AP MLD maintained by the AP MLD, wherein the TIM element comprises a first Element ID field, a first Length field, a first delivery traffic indication map (DTIM) Count field, a first DTIM Period field, a first Bitmap Control field and a first Partial Virtual Bitmap (PVB) field, and the Extended TIM element comprises a second Element ID field, a second Length field, an Element ID Extension field, a second DTIM Count field, a second DTIM Period field, a Link Info field, a second Bitmap Control field and a second PVB field, wherein the first DTIM Count field in the TIM element and the second DTIM Count field in the Extended TIM element are set to a same value, and the first DTIM Period field in the TIM element and the second DTIM Period field in the Extended TIM element are set to a same value.

* * * * *